(12) United States Patent
Bushhouse et al.

(10) Patent No.: US 8,916,636 B2
(45) Date of Patent: Dec. 23, 2014

(54) BASECOAT COMPOSITION AND ASSOCIATED PAPERBOARD STRUCTURE

(71) Applicant: MeadWestvaco Corporation, Richmond, VA (US)

(72) Inventors: Steven G. Bushhouse, New Kent, VA (US); Gary P. Fugitt, Rockville, VA (US); Sven S. Arenander, Richmond, VA (US)

(73) Assignee: MeadWestvaco Corporation, Richmond, VA (US)

( * ) Notice: Subject to any disclaimer, the term of this patent is extended or adjusted under 35 U.S.C. 154(b) by 0 days.

(21) Appl. No.: 13/826,764

(22) Filed: Mar. 14, 2013

(65) Prior Publication Data

US 2014/0275387 A1    Sep. 18, 2014

(51) Int. Cl.
*C08K 3/26*  (2006.01)
*C08K 3/34*  (2006.01)

(52) U.S. Cl.
CPC .. *C08K 3/26* (2013.01); *C08K 3/346* (2013.01)
USPC .......................................... 524/425; 524/445

(58) Field of Classification Search
CPC .......................... C08K 2003/265; C08K 3/346
USPC .................................................. 524/425, 445
See application file for complete search history.

(56) References Cited

U.S. PATENT DOCUMENTS

| | | | |
|---|---|---|---|
| 1,913,329 A | 6/1933 | Bradner |
| 3,963,843 A | 6/1976 | Hitchmough et al. |
| 4,749,445 A | 6/1988 | Vreeland et al. |
| 4,888,983 A | 12/1989 | Dunfield et al. |
| 5,298,335 A | 3/1994 | Reed et al. |
| 5,320,672 A | 6/1994 | Whalen-Shaw |
| 5,631,080 A | 5/1997 | Fugitt |
| 5,690,527 A | 11/1997 | Rutledge et al. |
| 6,582,553 B2 | 6/2003 | Jewell et al. |
| 6,777,075 B2 | 8/2004 | Concannon et al. |
| 6,802,938 B2 | 10/2004 | Mohan et al. |
| 6,866,906 B2 | 3/2005 | Williams et al. |
| 7,208,039 B2 | 4/2007 | Jones et al. |
| 7,306,668 B2 | 12/2007 | Pring et al. |
| 7,425,246 B2 | 9/2008 | Urscheler |
| 7,504,002 B2 | 3/2009 | Brelsford et al. |
| 7,749,583 B2 | 7/2010 | Fugitt et al. |
| 7,806,978 B2 | 10/2010 | Pruett et al. |
| 8,025,763 B2 | 9/2011 | Fugitt et al. |
| 8,142,887 B2 | 3/2012 | Fugitt et al. |
| 8,187,420 B2 | 5/2012 | Fugitt et al. |
| 8,313,614 B2 | 11/2012 | Fugitt et al. |
| 2003/0085012 A1 | 5/2003 | Jones et al. |
| 2004/0065423 A1 | 4/2004 | Swerin et al. |
| 2004/0229063 A1 | 11/2004 | Concannon et al. |
| 2005/0039871 A1 | 2/2005 | Urscheler et al. |
| 2005/0247418 A1 | 11/2005 | Jones et al. |
| 2006/0009566 A1 | 1/2006 | Jones et al. |
| 2006/0124033 A1 | 6/2006 | Pruett et al. |
| 2007/0169902 A1 | 7/2007 | Brelsford et al. |
| 2008/0060774 A1 | 3/2008 | Zuraw et al. |
| 2008/0245273 A1 | 10/2008 | Vyorkka et al. |
| 2008/0311416 A1 | 12/2008 | Kelly et al. |
| 2009/0236062 A1 | 9/2009 | Fugitt et al. |
| 2009/0239047 A1 | 9/2009 | Fugitt et al. |
| 2011/0274856 A1* | 11/2011 | Koenig et al. ............. 428/32.21 |

FOREIGN PATENT DOCUMENTS

GB    2339785 A    2/2000

OTHER PUBLICATIONS

International Search Report and Opinion for PCT/US14/20096, Jul. 24, 2014.

* cited by examiner

*Primary Examiner* — Peter Szekely
(74) *Attorney, Agent, or Firm* — MeadWestvaco Intellectual Property Group

(57) ABSTRACT

A basecoat composition including a carrier component and a pigment component dispersed in the carrier component, the pigment component including all pigments in the basecoat composition, wherein the pigment component has a median particle size between about 3 and about 8 micrometers, and wherein at most about 15 percent by weight of the pigment component has a particle size smaller than 1 micrometer.

32 Claims, 13 Drawing Sheets

BASECOAT COMPOSITION AND ASSOCIATED PAPERBOARD STRUCTURE

FIELD

This patent application is directed to coatings for paperboard and, more particularly, to basecoat compositions for forming smooth paperboard structures.

BACKGROUND

Paperboard is used in various packaging applications. For example, aseptic liquid packaging paperboard is used for packaging beverage cartons, boxes and the like. Therefore, customers often prefer paperboard having a generally smooth surface with few imperfections to facilitate the printing of high quality text and graphics, thereby increasing the visual appeal of products packaged in paperboard.

Manufacturers have attempted to smooth the surface of paperboard by coating the entire surface of the paperboard with a basecoat comprised of various pigments, such as clay, calcium carbonate, $TiO_2$ and the like, then overcoating this base with a second and sometimes even a third coating, which is generally referred to as a topcoat. It was discovered that high quantities of relatively fine pigment particles applied to the surface of paperboard provided a smoother surface without sacrificing bulk. Indeed, it has been understood that the more pigment particles applied to the surface of the paperboard the better the resulting smoothness. However, the use of relatively high quantities of pigments substantially increases the cost of preparing smooth and highly printable paperboard.

Accordingly, those skilled in the art continue with research and development efforts in the field of paperboard coating.

SUMMARY

In one embodiment, the disclosed basecoat composition may include a carrier component and a pigment component dispersed in the carrier component, the pigment component including all pigments in the basecoat composition, wherein the pigment component has a median particle size between about 3 and about 8 micrometers, and wherein at most about 15 percent by weight of the pigment component has a particle size smaller than 1 micrometer.

In another embodiment, the disclosed paperboard structure may include a paperboard substrate including a first major surface and a second major surface and a basecoat applied to the first major surface and/or the second major surface, the basecoat comprising a pigment component, the pigment component comprising all pigments in the basecoat, wherein the pigment component has a median particle size between about 3 and about 8 micrometers, and wherein at most about 15 percent by weight of the pigment component has a particle size smaller than 1 micrometer.

Other embodiments of the disclosed basecoat composition and associated paperboard structure will become apparent from the following description, the accompanying drawings and the appended claims.

DETAILED DESCRIPTION

Paperboard structures having desired smoothness may be obtained by engineering the particle size distribution of the particles used in the associated basecoat composition. Specifically, it has now been discovered that the significant presence of excess fine particles, as well as excess coarse particles, has a detrimental effect on smoothness, and that smoothness can be enhanced by using particles having a relatively narrow particle size distribution within an optimized median particle size range.

Figure 1:
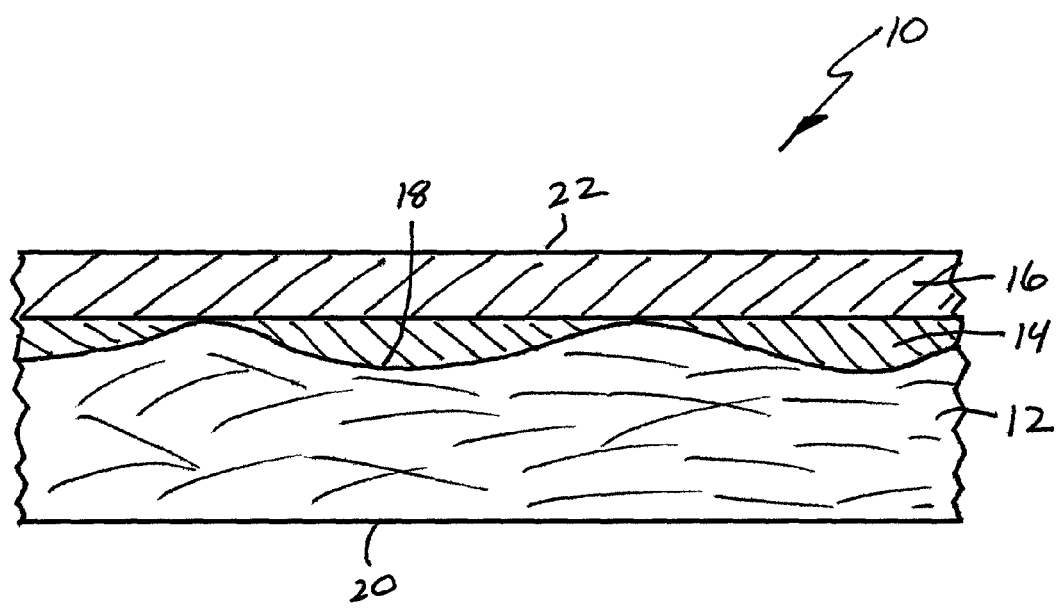
FIG. 1 is a cross-sectional view of one embodiment of the disclosed paperboard structure.

Referring to FIG. 1, one embodiment of the disclosed paperboard structure, generally designated 10, may include a paperboard substrate 12, a basecoat 14 and, optionally, a top coat 16. The paperboard substrate 12 may include a first major surface 18 and a second major surface 20. The basecoat 14 may be applied only to the first major surface 18 (C1S) or to both the first major surface 18 and the second major surface 20 (C2S). The top coat 16 may be applied over the basecoat 14 to present an outermost coating surface 22. Additional coating layers (not shown) may be positioned between the basecoat 14 and the top coat 16 without departing from the scope of the present disclosure.

The paperboard substrate 12 may be any web of fibrous material that is capable of being coated with the disclosed basecoat 14. The paperboard substrate 12 may be bleached or unbleached, and may be paper or thicker and more rigid than paper. For example, the paperboard substrate 12 may have an uncoated basis weight of about 85 pounds per 3000 $ft^2$ or more. Examples of appropriate paperboard substrates 12 include corrugating medium, linerboard, solid bleached sulfate (SBS) and aseptic liquid packaging paperboard In one particular implementation, the basecoat 14 may be applied to the first major surface 18 of the paperboard substrate 12 in a quantity sufficient to fill the pits and crevices in the first major surface 18 without the need for coating the entire first major surface 18 of the paperboard substrate 12, thereby forming a discontinuous film on the first major surface 18. For example, the basecoat 14 may be applied using a blade coater such that the blade coater urges the basecoat 14 into the pits and crevices in the first major surface 18 while removing the basecoat 14 from the first major surface 18. Specifically, the basecoat 14 may be applied in a manner that is akin to spackling, wherein substantially all of the basecoat 14 resides in the pits and crevices in the first major surface 18 of the paperboard substrate 12 rather than on the first major surface 18 of the paperboard substrate 12.

At this point, those skilled in the art will appreciate that when the basecoat 14 is used in a blade coater the spacing between the moving paperboard substrate 12 and the blade of the coater may be minimized to facilitate filling the pits and crevices in the first major surface 18 without substantially depositing the basecoat 14 on the first major surface 18 of the paperboard substrate 12 (i.e., forming a discontinuous film on the first major surface 18 of the paperboard substrate 12). In other words, the blade of the coater may be positioned sufficiently close to the first major surface 18 of the moving paperboard substrate 12 such that the blade of the coater urges the basecoat 14 into the pits and crevices in the first major surface 18 of the paperboard substrate 12, while removing excess basecoat 14 from the first major surface 18 of the paperboard substrate 12.

The top coat 16 may be any appropriate topcoat. For example, the topcoat 16 may include calcium carbonate, clay and various other components and may be applied over the basecoat 14 as a slurry. Top coats are well known by those skilled in the art and any conventional or non-conventional top coat composition may be used without departing from the scope of the present disclosure.

The outermost coating surface 22 of the disclosed paperboard structure 10 may be relatively smooth. In one realization, the outermost coating surface 22 of the disclosed paperboard structure 10 may have a Parker Print Surface (PPS 10S) smoothness of at most about 5 micrometers. In another realization, the outermost coating surface 22 of the disclosed paperboard structure 10 may have a Parker Print Surface (PPS 10S) smoothness of at most about 4 micrometers. In another realization, the outermost coating surface 22 of the disclosed paperboard structure 10 may have a Parker Print Surface (PPS 10S) smoothness of at most about 3 micrometers. In another realization, the outermost coating surface 22 of the disclosed paperboard structure 10 may have a Parker Print Surface (PPS 10S) smoothness of at most about 2 micrometers.

The basecoat 14 may include a pigment component having an engineered particle size distribution, as discussed in greater detail herein. To facilitate application of the basecoat 14 (and its pigment component) to the paperboard substrate 12, the basecoat 14 may be initially prepared as a basecoat composition that includes a pigment component and a carrier component. The carrier component may include any suitable carrier, such as water. The pigment component may be dispersed in the carrier component to facilitate application of the basecoat 14 to the paperboard substrate 12. As an example, the basecoat composition may have a solids content of at most about 70 percent by weight, such as at most about 67 percent by weight, though those skilled in the art will appreciate that the appropriate solids content may depend on various factors, such as the technique being used to apply the basecoat composition to the paperboard substrate 12. Additional components, such as binders (e.g., latex, starch, etc.), thickeners, stabilizers, dispersing agents and the like, may be included in the basecoat composition without departing from the scope of the present disclosure.

The pigment component of the basecoat 14 (or of the basecoat composition) refers to all of the pigments within the basecoat 14 (or the basecoat composition). The pigment component may include a single type of pigment or, alternatively, may be a blend of two or more different pigments.

Figure 2:
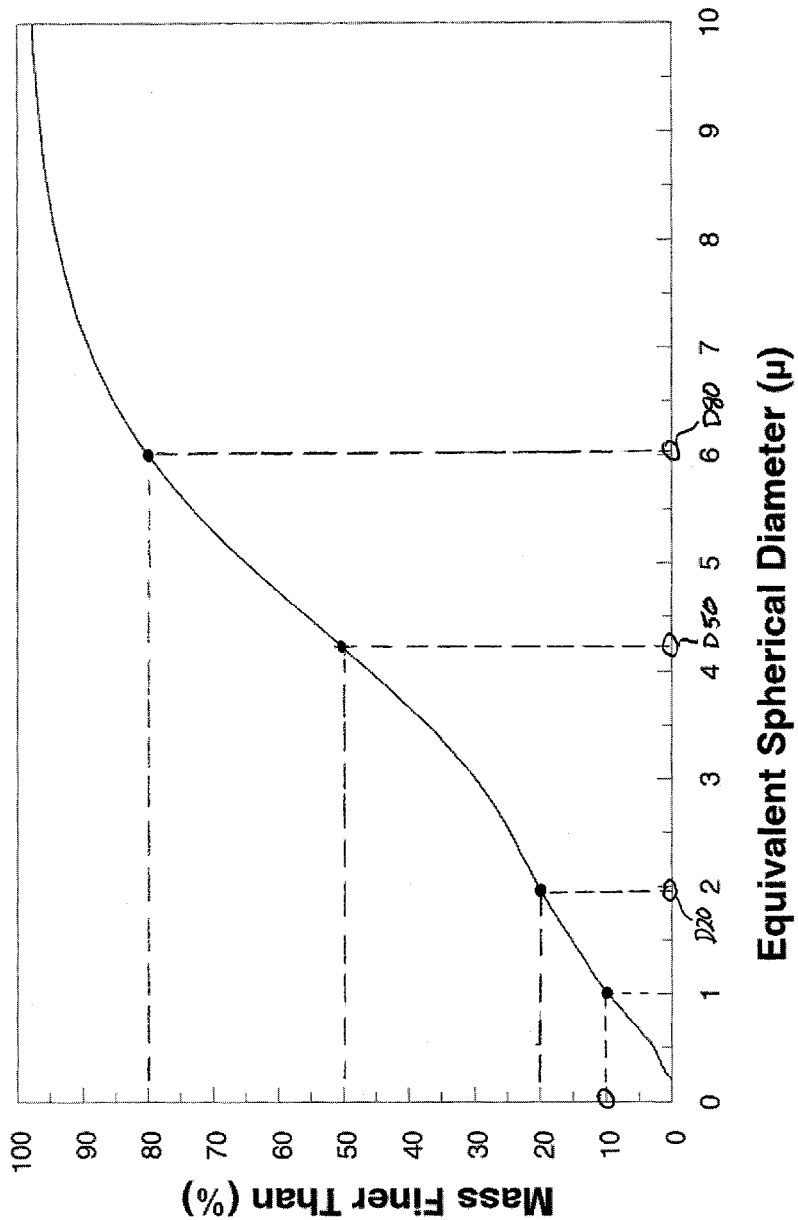
FIG. 2 is a graphical representation of the mass percent particle size distribution of a pigment suitable for use as the pigment component of the disclosed pigment composition.

FIG. 2 provides a graphical representation of the mass particle size distribution of VICALITY® Heavy precipitated calcium carbonate ("PCC"), which is commercially available from Minerals Technologies Inc. of New York, N.Y. The VICALITY® Heavy pigment has a median particle size of about 4.2 micrometers, a steepness parameter of about 1.0, and a fines content wherein at most about 10 percent by weight of the pigment particles have a particle size less than 1 micrometer.

As used herein, the "particle size" of a pigment refers to the equivalent spherical diameter of the pigment, which may be measured using a particle size analyzer regardless of whether the particles are spherical (or near spherical) or non-spherical. The data presented in FIG. 2 was collected using a SEDI-GRAPH® 5120 particle size analyzer, which is commercially available from Micrometrics Instrument Corporation of Norcross, Ga.

As used herein, "median particle size" refers to the particle size at which 50 percent (by weight) of the pigment particles are less than that particle size. Therefore, as shown in FIG. 2, the median particle size (D50) of VICALITY® Heavy pigment is about 4.2 micrometers.

As used herein, "steepness parameter" ($\Psi$) refers to the narrowness of the particle size distribution and is calculated as follows:

$$\Psi = \frac{D80 - D20}{D50}$$

where D50 is the median particle size, D80 is the particle size at which 80 percent (by weight) of the pigment particles are smaller and D20 is the particle size at which 20 percent (by weight) of the pigment particles are smaller. Therefore, as shown in FIG. 2, the steepness parameter of VICALITY® Heavy pigment is about 1.0 (i.e., (6.05-1.93)/4.23=0.97).

The fines content can be expressed at various particle sizes. As one example, the fines content can be expressed as the percentage (by weight) of particles having a particle size less than 1 micrometer. Therefore, as shown in FIG. 2, VICALITY® Heavy pigment has a fines content wherein at most about 10 percent by weight of the pigment particles have a particle size less than 1 micrometer.

The median particle size of the disclosed pigment component may be within a specific range. In one expression, the median particle size may range from about 3 micrometers to about 8 micrometers. In another expression, the median particle size may range from about 3 micrometers to about 7 micrometers. In another expression, the median particle size may range from about 3 micrometers to about 6 micrometers. In yet another expression, the median particle size may range from about 4 micrometers to about 5 micrometers.

The steepness parameter of the disclosed pigment component may be less than a threshold value, which may correspond to a relatively narrow particle size distribution. In one expression, the steepness parameter may be at most about 1.3. In another expression, the steepness parameter may be at most about 1.2. In another expression, the steepness parameter may be at most about 1.1. In yet another expression, the steepness parameter may be at most about 1.0.

The fines content of the disclosed pigment component may be relatively low. In one expression, at most about 15 percent by weight of the pigment particles of the pigment component may have a particle size less than 1 micrometer. In another expression, at most about 14 percent by weight of the pigment particles of the pigment component may have a particle size less than 1 micrometer. In another expression, at most about 13 percent by weight of the pigment particles of the pigment component may have a particle size less than 1 micrometer. In another expression, at most about 12 percent by weight of the pigment particles of the pigment component may have a particle size less than 1 micrometer. In another expression, at most about 11 percent by weight of the pigment particles of the pigment component may have a particle size less than 1 micrometer. In yet another expression, at most about 10 percent by weight of the pigment particles of the pigment component may have a particle size less than 1 micrometer.

The coarse content of the disclosed pigment component may also be relatively low. In one expression, at most about 20 percent by weight of the pigment particles of the pigment component may have a particle size greater than 8 micrometer. In another expression, at most about 15 percent by weight of the pigment particles of the pigment component may have a particle size greater than 8 micrometer. In yet another expression, at most about 10 percent by weight of the pigment particles of the pigment component may have a particle size greater than 8 micrometer.

The disclosed pigment component particle size distribution (combination of median particle size, fines content, steepness parameter and/or coarse content) may be obtained by selecting a single pigment for use as the entire pigment component, wherein the single pigment provides the desired particle size distribution. For example, VICALITY® Heavy precipitated calcium carbonate, a commercially available pigment, may have the desired particle size distribution, as shown in FIG. 2.

It is also contemplated that pigments and pigment blends may be engineered to have the disclosed pigment component particle size distribution. As one example, the disclosed particle size distribution may be achieved by mixing together various existing (e.g., commercially available) pigments in appropriate proportions. As another example, an existing pigment or pigment blend may be processed (e.g., sifting and separating) to achieve the disclosed particle size distribution.

Thus, various pigments may be included in the disclosed pigment component. In one variation, the pigment component may be substantially entirely comprised of inorganic pigments. In another variation, the pigment component may include both inorganic and organic pigments. In yet another variation, the pigment component may be substantially free of platy pigments (e.g., platy clays), wherein "platy" refers to pigments having a shape factor greater than 60. Examples of pigments that may be used to design a pigment component having the disclosed particle size distribution include, but are not limited to, precipitated calcium carbonate, ground calcium carbonate, talc and clay (e.g., kaolin).

EXAMPLE 1

The particle size distributions of six calcium carbonate pigments were measured and evaluated using a SEDI-GRAPH® 5120 particle size analyzer. Pigment 1 ("Fine Ground") was a fine ground calcium carbonate, HYDROCARB® 90, commercially available from Omya AG of Oftringen, Switzerland. Pigment 2 ("Coarse Ground") was a coarse ground calcium carbonate, HYDROCARB® 60, commercially available from Omya AG. Pigment 3 ("Extra-Coarse Ground") was an extra-coarse ground calcium carbonate, HYDROCARB® PG3, commercially available from Omya AG. Pigment 4 ("Fine Precipitated") was a fine prismatic precipitated calcium carbonate, ALBAGLOS® S, commercially available from Minerals Technologies Inc. Pigment 5 ("Coarse Precipitated") was a coarse rhombohedal precipitated calcium carbonate, VICALITY® Heavy, commercially available from Minerals Technologies Inc. Pigment 6 ("Extra-Coarse Precipitated") was an extra-coarse rhombohedal precipitated calcium carbonate, CALESSENCE® 1500, commercially available from Minerals Technologies Inc.

The results are graphically presented in FIGS. 3 and 4, and specific data are presented in Table 1, below:

TABLE 1

|  | Fine Ground Hydro-carb 90 | Coarse Ground Hydro-carb 60 | Extra-Course Ground Hydro-carb PG3 | Fine Precipitated Albaglos S | Coarse Precipitated Vicality Heavy | Extra-Course Precipitated Calessence |
|---|---|---|---|---|---|---|
| Modal Diameter (μ) | 0.89 | 2.00 | 4.22 | 0.79 | 5.01 | 11.89 |
| Median Diameter (μ) | 0.69 | 1.37 | 2.85 | 0.90 | 4.22 | 11.15 |
| Mass % < 0.5 μ | 38.3 | 19.2 | 10.8 | 8.3 | 3.4 | 0.6 |
| Mass % < 1 μ | 69.3 | 39.1 | 21.5 | 62.8 | 10.8 | 1.1 |
| Mass % < 2 μ | 93.6 | 67.7 | 39.0 | 84.2 | 20.8 | 1.8 |
| Mass % > 8 μ | 0.0 | 1.0 | 12.4 | 3.5 | 5.6 | 80.0 |
| Mass % > 10 μ | 0.0 | 0.8 | 6.1 | 1.6 | 2.0 | 59.2 |
| Steepness (D80-D20/D50) | 1.5 | 1.5 | 2.0 | 1.0 | 1.0 | 0.6 |

Figure 4:
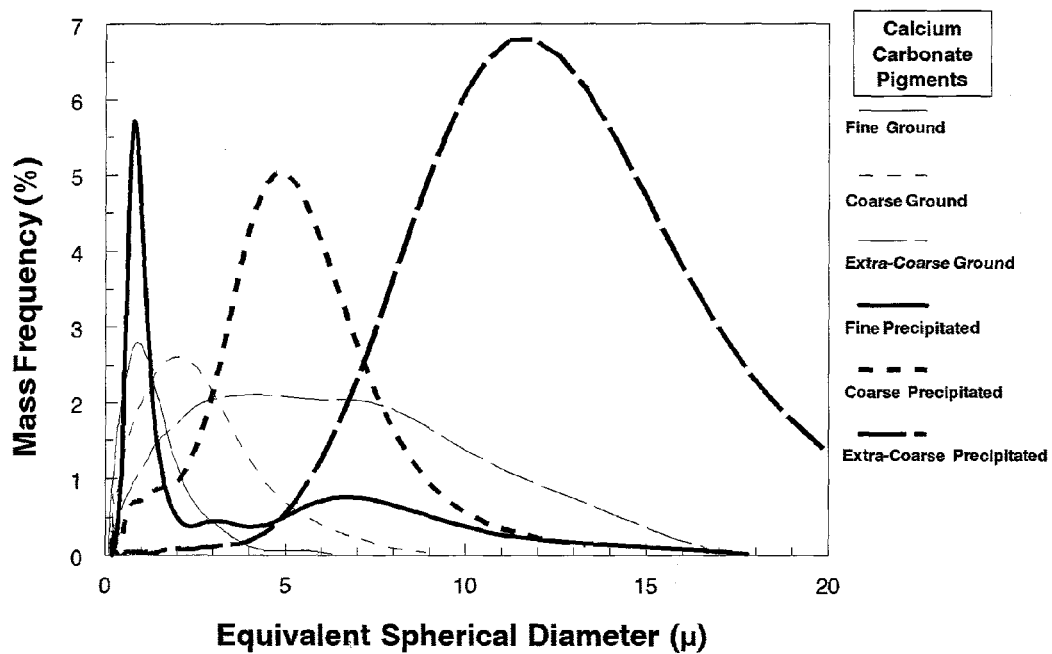
FIG. 4 is a graphical representation of the mass frequency particle size distribution of the calcium carbonate pigments of FIG. 3.

In addition to providing the median particle size (shown as "Median Diameter"), the steepness parameter, percent less than 1 micrometer and percent greater than 8 micrometers, Table 1 also provides the modal diameter (the particle diameter that represents the highest point of each curve in FIG. 4), percent less than 0.5 micrometers, percent less than 2 micrometers, and percent greater than 10 micrometers.

Figure 3:
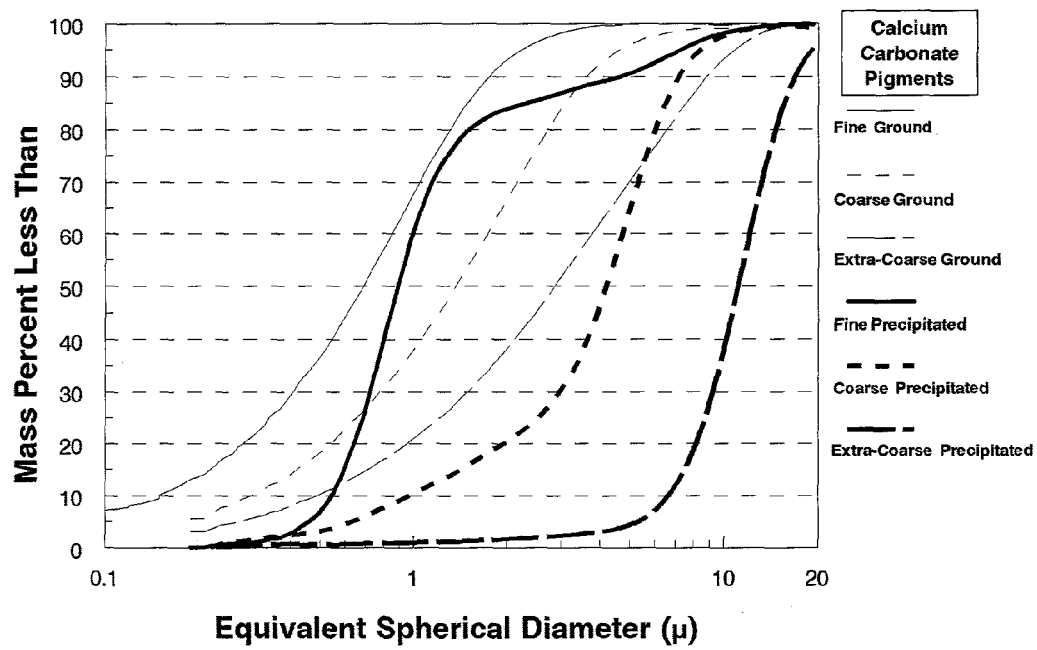
FIG. 3 is a graphical representation of the mass percent particle size distribution of various calcium carbonate pigments.

As shown in FIGS. 3 and 4 and Table 1, Pigments 1-6 have a wide range of particle size distributions. Pigment 1 (Fine Ground) has a small average particle size, a relatively wide size distribution, the most fines, and the least coarse particles.

Pigment 2 (Coarse Ground) has substantially the same steepness parameter as Pigment 1, but a median particle size that is double. Pigment 2 has about half as many small particles as Pigment 1, but still virtually no particles larger than 8 micrometers.

Pigment 3 (Extra-Coarse Ground) is the coarsest ground carbonate evaluated—it has a median particle size that is about double the median particle size of Pigment 2 and four times as large as Pigment 1. Pigment 3 has the broadest distribution of all the pigments. It still has a relatively large amount of fine particles, but also has a significant amount of coarse particles.

Pigment 4 (Fine Precipitated) has a similar median particle size to Pigment 1, but a much narrower particle size distribution (steepness parameter of 1.0 versus 1.5). Pigment 4 has a much smaller amount of particles less than 0.5 micrometers, compared to Pigment 1, but a comparable amount less than 1 micrometer. Pigment 4 has very few coarse particles.

Pigment 5 (Coarse Precipitated) has an average particle size larger than the Pigment 3, but has very few fine or coarse particles, and has a narrow particle size distribution. Therefore, Pigment 5 may be used as the pigment component of the disclosed basecoat (and basecoat composition).

Pigment 6 (Extra-Coarse Precipitated) has a very large average particle size. The majority of its particles are greater than 8 microns. Pigment 6 has the lowest steepness index of any of the pigments evaluated in Example 1.

EXAMPLE 2

A solid bleached sulfate (SBS) paperboard was used to make double-coated board samples. The board had an average basis weight of about 125 pounds per 3000 ft$^2$ and an average roughness of 7.5 micrometers, as measured by Parker Print Surf (PPS 10S) smoothness. Three different basecoat compositions were applied to a continuous web of the SBS paperboard using a pilot coater. The basecoat compositions were applied at a coat weight of about 9 pounds per 3000 ft$^2$. A common top coat was applied to all three basecoated structures to give a top coat weight of about 6 pounds per 3000 ft$^2$. The topcoated structures were gloss calendered, under common conditions, to produce a 75 degree gloss of about 50.

The three basecoat compositions were prepared as follows: Basecoat Composition 1 included 100 parts Pigment 1 (HYDROCARB® 90) and 20 parts latex binder; Basecoat Composition 2 included 100 parts Pigment 2 (HYDROCARB® 60) and 20 parts latex binder; and Basecoat Composition 3 included 100 parts Pigment 5 (VICALITY® Heavy) and 20 parts latex binder. Water was used as the carrier component of Basecoat Compositions 1-3 to achieve the required solids content for coating. An alkali-swellable thickener was used to adjust the Brookfield 20 rpm viscosity of Basecoat Compositions 1-3 to about 2500 cP.

Basecoat Compositions 1-3 were each applied to a continuous web of the SBS paperboard using a pilot coater. The test data for the double coated board samples are presented in Table 2, below:

TABLE 2

|  | Hydrocarb 90 | Hydrocarb 60 | Vicality Heavy |
| --- | --- | --- | --- |
| Basecoat Weight (lb/3000 ft$^2$) | 9 | 8.9 | 8.6 |
| Topcoat Weight (lb/3000 ft$^2$) | 6.2 | 6.2 | 6.1 |
| Basecoated PPS Smoothness (µ) | 4.79 | 5.46 | 4.82 |
| Calendered Topcoated PPS (µ) | 1.65 | 1.64 | 1.14 |
| IGT Pick Strength | 119.5 | 139.5 | 148.2 |

Both HYDROCARB® 90 and VICALITY® Heavy produced substantially reduced basecoat-only roughness, but after topcoating, HYDROCARB® 90 and HYDROCARB® 60 gave equal roughness values, while VICALITY® Heavy produced substantially reduced PPS roughness values. The IGT pick test measures surface strength. The IGT results show HYDROCARB® 90 resulted in reduced coating strength, but VICALITY® Heavy and HYDROCARB® 60 were equivalent.

EXAMPLE 3

A solid bleached sulfate (SBS) paperboard was used to make double-coated board samples. The board had an average basis weight of about 120 pounds per 3000 ft$^2$ and an average roughness of 7.3 micrometers, as measured by Parker Print Surf (PPS 10S) smoothness. Four different basecoat compositions were applied to a continuous web of the SBS paperboard using a pilot coater. The basecoat compositions were applied at a coat weight of about 9 pounds per 3000 ft$^2$. A common top coat was applied to all four basecoated structures to give a top coat weight of about 6 pounds per 3000 ft$^2$. The topcoated structures were gloss calendered, under common conditions, to produce a 75 degree gloss of about 50.

The four basecoat compositions were prepared as follows: Basecoat Composition 4 included 100 parts Pigment 2 (HYDROCARB® 60) and 20 parts latex binder; Basecoat Composition 5 included 100 parts Pigment 5 (VICALITY® Heavy) and 20 parts latex binder; Basecoat Composition 6 included 100 parts Pigment 6 (CALESSENCE® 1500) and 20 parts latex binder; and Basecoat Composition 7 included 100 parts Pigment 5 (HYDROCARB® PG3) and 20 parts latex binder. Water was used as the carrier component of Basecoat Compositions 4-7 to achieve the required solids content for coating. An alkali-swellable thickener was used to adjust the Brookfield 20 rpm viscosity of Basecoat Compositions 4-7 to about 2500 cP.

Basecoat Compositions 4-7 were each applied to a continuous web of the SBS paperboard using a pilot coater. The test data for the double coated board samples are presented in Table 3, below:

TABLE 3

|  | Hydrocarb 60 | Vicality Heavy | Calessence | Hydrocarb PG3 |
| --- | --- | --- | --- | --- |
| Basecoat Weight (lb/3000 ft$^2$) | 9.5 | 6.4 | 9.6 | 8.9 |
| Topcoat Weight (lb/3000 ft$^2$) | 7.3 | 5.9 | 6.2 | 5.5 |
| Basecoated PPS Smoothness (µ) | 5.06 | 4.66 | 7.50 | 6.36 |
| Calendered Topcoated PPS (µ) | 1.98 | 1.48 | 2.04 | 2.42 |
| IGT Pick Strength | 163 | 144 | 184 | 168 |

VICALITY® Heavy gave substantially improved roughness values compared to HYDROCARB® 60, for both basecoat-only and topcoated calendered Parker Print Surf Smoothness. CALESSENCE® 1500 gave very little improvement in basecoat-only smoothness of the uncoated board, but when topcoated, gave a topcoated smoothness comparable to HYDROCARB® 60. HYDROCARB® PG3 gave a substantially rougher surface than HYDROCARB® 60 for both basecoat-only and topcoated smoothness. IGT Pick results show a slightly lower coating strength for VICALITY® Heavy, compared to HYDROCARB® 60. CALESSENCE® 1500 was slightly stronger than HYDROCARB® 60, and HYDROCARB® PG3 was equal

EXAMPLE 4

The conditions and pigments of Example 4 were the same as Example 3, except for the weight and roughness of the uncoated board. Specifically, the uncoated board used for Example 4 had an average roughness of 7.3 micrometers, as measured by Parker Print Surf (PPS 10S) smoothness, and the basis weight was 104 pounds per 3000 ft². The test data for the double coated board samples are presented in Table 4, below:

TABLE 4

|  | Hydrocarb 60 | Vicality Heavy | Calessence | Hydrocarb PG3 |
|---|---|---|---|---|
| Basecoat Weight (lb/3000 ft²) | 10.0 | 9.0 | 9.9 | 9.4 |
| Topcoat Weight (lb/3000 ft²) | 6.2 | 6.0 | 5.9 | 6.1 |
| Basecoated PPS Smoothness (μ) | 7.64 | 5.83 | 8.02 | 7.30 |
| Calendered Topcoated PPS (μ) | 2.98 | 1.94 | 2.44 | 3.00 |
| IGT Pick Strength | 154 | 97 | 142 | 118 |

VICALITY® Heavy gave a very large improvement in basecoat-only and topcoated smoothness, compared to HYDROCARB® 60. CALESSENCE® 1500 gave similar basecoat-only roughness values compared to HYDROCARB® 60, but gave a substantial improvement in topcoated smoothness compared to HYDROCARB® 60, but only about half of the benefit obtained by VICALITY® Heavy. HYDROCARB® PG3 gave equivalent results compared to HYDROCARB® 60.

EXAMPLE 5

A solid bleached sulfate (SBS) paperboard was used to make double-coated board samples. The board had an average basis weight of about 120 pounds per 3000 ft² and an average roughness of 7.3 micrometers, as measured by Parker Print Surf (PPS 10S) smoothness. Three different basecoat compositions were applied to a continuous web of the SBS paperboard using a pilot coater. The basecoat compositions were applied at a coat weight of about 9 pounds per 3000 ft². A common top coat was applied to all three basecoated structures to give a top coat weight of about 6 pounds per 3000 ft². The topcoated structures were gloss calendered, under common conditions, to produce a 75 degree gloss of about 50.

Blends of a coarse precipitated calcium carbonate (VICALITY® Heavy) with an ultrafine ground calcium carbonate (HYDROCARB® HG) and an extra-coarse precipitated calcium carbonate (CALESSENCE® 1500) were used to demonstrate the effect of increasing the percentage of fine or coarse particles in VICALITY® Heavy on final double coated sheet smoothness. Therefore, the three basecoat compositions were prepared as follows: Basecoat Composition 8 included 100 parts VICALITY® Heavy (Pigment 5) and 20 parts latex binder; Basecoat Composition 9 included 80 parts VICALITY® Heavy (Pigment 5), 20 parts CALESSENCE® 1500 (Pigment 6) and 20 parts latex binder; and Basecoat Composition 10 included 80 parts VICALITY® Heavy (Pigment 5), 20 parts HYDROCARB® HG (an ultrafine ground calcium carbonate commercially available from Omya AG) and 20 parts latex binder. Water was used as the carrier component of Basecoat Compositions 8-10 to achieve the required solids content for coating. An alkali-swellable thickener was used to adjust the Brookfield 20 rpm viscosity of Basecoat Compositions 8-10 to about 2500 cP.

Figure 5:
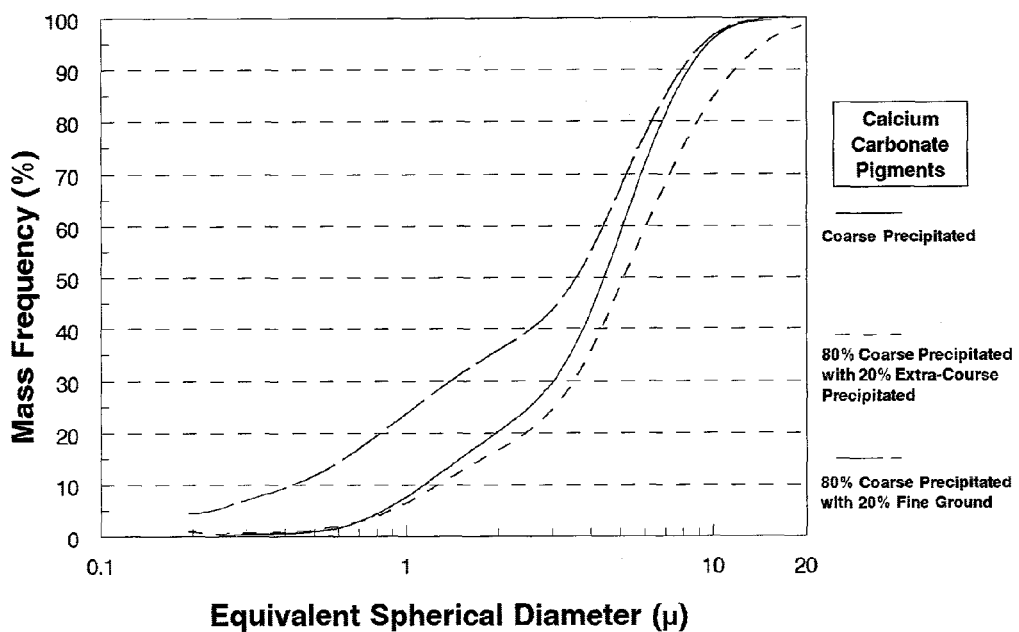
FIG. 5 is a graphical representation of the mass percent particle size distribution of blended calcium carbonate pigments.
Figure 6:
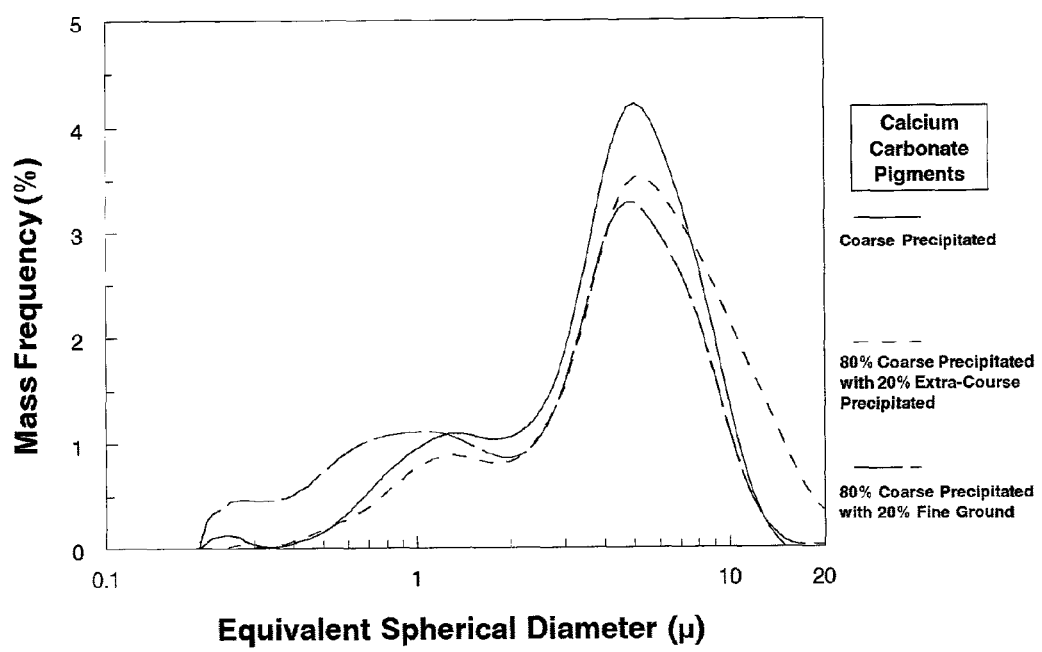
FIG. 6 is a graphical representation of the mass frequency particle size distribution of the blended calcium carbonate pigments of FIG. 5.

The particle size distributions of the pigment components of Basecoat Compositions 8-10 were measured and evaluated using a SEDIGRAPH® 5120 particle size analyzer. The results are graphically presented in FIGS. 5 and 6, and specific data are presented in Table 5, below:

TABLE 5

|  | Vicality Heavy | 80 Parts Vicality Heavy 20 Parts Calessence | 80 Parts Vicality Heavy 20 Parts Hydrocarb HG |
|---|---|---|---|
| Modal Diameter (μ) | 5.31 | 4.73 | 5.01 |
| Median Diameter (μ) | 4.44 | 5.14 | 3.61 |
| Mass % < 0.5μ | 1.0 | 1.4 | 12.3 |
| Mass % < 1μ | 8.1 | 7.0 | 24.4 |
| Mass % < 2μ | 20.8 | 17.2 | 36.4 |
| Mass % > 8μ | 10.9 | 24.1 | 9.0 |
| Mass % > 10μ | 3.5 | 14.5 | 2.9 |
| Steepness (D80-D20/D50) | 1.1 | 1.3 | 1.5 |

Compared to VICALITY® Heavy, the blend with CALESSENCE® 1500 has twice as many particles greater than 8 micrometers and the blend with HYDROCARB® HG has three times as many particles less than 1 micrometers.

Basecoat Compositions 8-10 were each applied to a continuous web of the SBS paperboard using a pilot coater. The test data for the double coated board samples (as well as a sample prepared using all HYDROCARB® 60 as the pigment component) are presented in Table 6, below:

TABLE 6

|  | Hydrocarb 60 | Vicality Heavy | 80-Vicality Heavy 20-Hydrocarb HG | 80-Vicality Heavy 20-Calessence |
|---|---|---|---|---|
| Basecoat Weight (lb/3000 ft²) | 8.7 | 8.2 | 9.1 | 9.7 |
| Topcoat Weight (lb/3000 ft²) | 5.8 | 7.2 | 6.2 | 7.2 |
| Basecoated PPS Smoothness (μ) | 5.56 | 4.50 | 5.96 | 5.05 |
| Calendered Topcoated PPS (μ) | 1.87 | 1.24 | 1.93 | 1.58 |
| IGT Pick Strength | 137 | 142 | 146 | 154 |

VICALITY® Heavy is shown to give a very large reduction in roughness compared to HYDROCARB® 60. Adding 20 parts CALESSENCE® 1500 to VICALITY® Heavy reduced by half the smoothness benefit, as compared to VICALITY® Heavy, but was still significantly better than HYDROCARB® 60. Adding 20 parts HYDROCARB® HG completely eliminated any smoothness benefit associated with using VICALITY® Heavy.

EXAMPLE 6

A solid bleached sulfate (SBS) paperboard was used to make double-coated board samples. The board had an average basis weight of about 125 pounds per 3000 ft² and an average roughness of 7.3 micrometers, as measured by Parker Print Surf (PPS 10S) smoothness. Three different basecoat compositions were applied to a continuous web of the SBS paperboard using a pilot coater. The basecoat compositions were applied at a coat weight of about 9 pounds per 3000 ft². A common top coat was applied to all three basecoated structures to give a top coat weight of about 6 pounds per 3000 ft². The topcoated structures were gloss calendered, under common conditions, to produce a 75 degree gloss of about 50.

The three basecoat compositions were prepared as follows: Basecoat Composition 11 included 100 parts HYDROCARB® 60 (Pigment 2 in Example 1) and 20 parts latex binder; Basecoat Composition 12 included 100 parts VICALITY® Heavy (Pigment 5 in Example 1) and 20 parts latex binder; and Basecoat Composition 13 included 100 parts ALBAGLOS® S (Pigment 4) and 20 parts latex binder. Water was used as the carrier component of Basecoat Compositions 11-13 to achieve the required solids content for coating. An alkali-swellable thickener was used to adjust the Brookfield 20 rpm viscosity of Basecoat Compositions 11-13 to about 2500 cP.

Basecoat Compositions 11-13 were each applied to a continuous web of the SBS paperboard using a pilot coater. The test data for the double coated board samples are presented in Table 7, below:

TABLE 7

|  | Hydrocarb 60 | Vicality Heavy | Albaglos S |
|---|---|---|---|
| Basecoat Weight (lb/3000 ft²) | 9.5 | 9.0 | 9.2 |
| Topcoat Weight (lb/3000 ft²) | 5.9 | 5.6 | 7.2 |
| Basecoated PPS Smoothness (μ) | 5.86 | 4.28 | 5.11 |
| Calendered Topcoated PPS (μ) | 2.18 | 1.34 | 2.11 |
| IGT Pick Strength | 148 | 152 | 160 |

The ALBAGLOS® S gave comparable results to HYDROCARB® 60, while the VICALITY® Heavy gave a very large reduction in roughness.

EXAMPLE 7

A series of pigment blends were formulated to produce a range of particle size distributions. The purpose of this series of pigments was to systematically add fine or coarse particles to a coarse narrow particle size calcium carbonate to ascertain the effect on coated smoothness.

Figure 7:
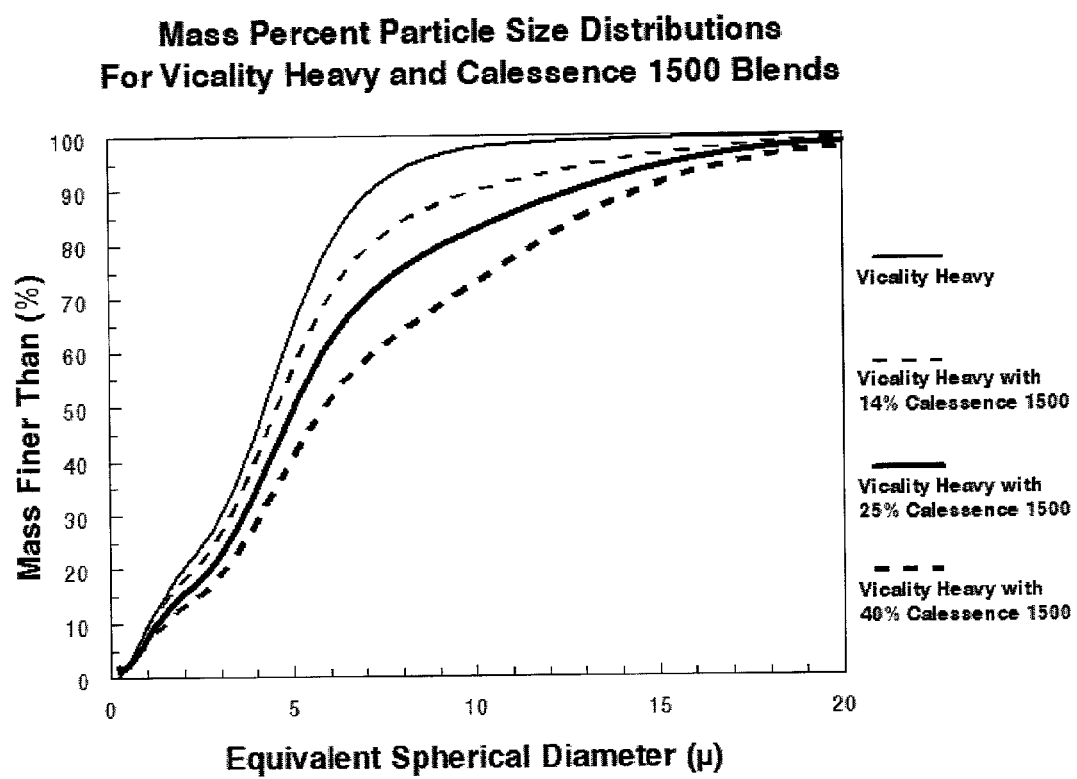
FIG. 7 is a graphical representation of the mass percent particle size distribution of various blends of coarse narrow particle size calcium carbonate pigments with extra-coarse calcium carbonate pigments.
Figure 8:
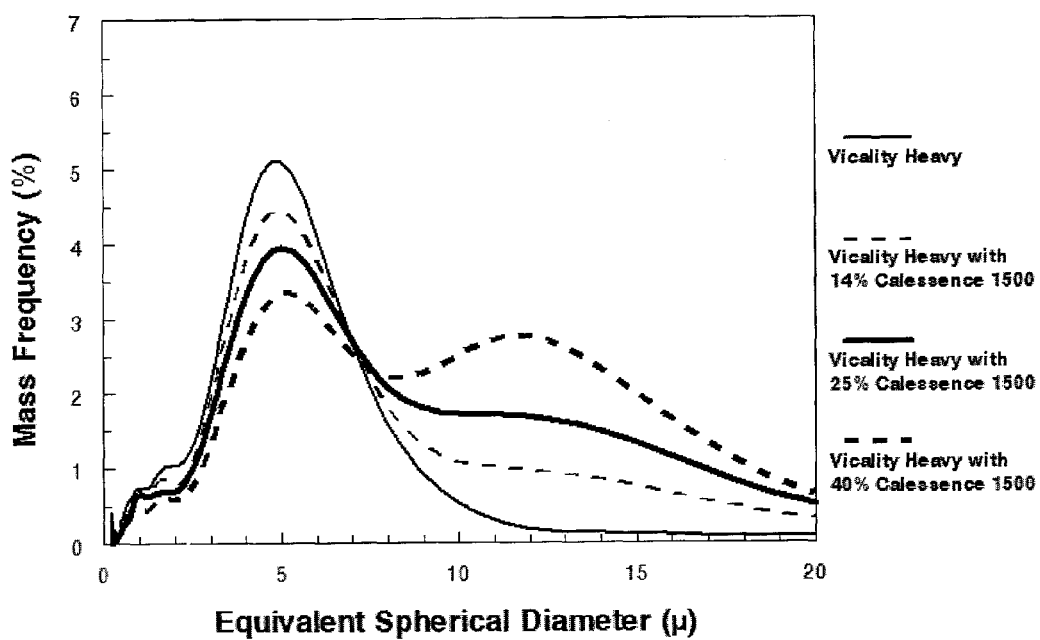
FIG. 8 is a graphical representation of the mass frequency particle size distribution of the pigment blends of FIG. 7.

CALESSENCE® 1500 was selected as an extra-coarse pigment, and was blended with VICALITY® Heavy to produce blends containing 14, 25 and 40 percent by weight CALESSENCE® 1500, respectively. Particle size distribution data for blends of VICALITY® Heavy with CALESSENCE® 1500 were collected using a SEDIGRAPH® 5120 particle size analyzer. The results are shown in FIGS. 7 and 8.

Figure 9:
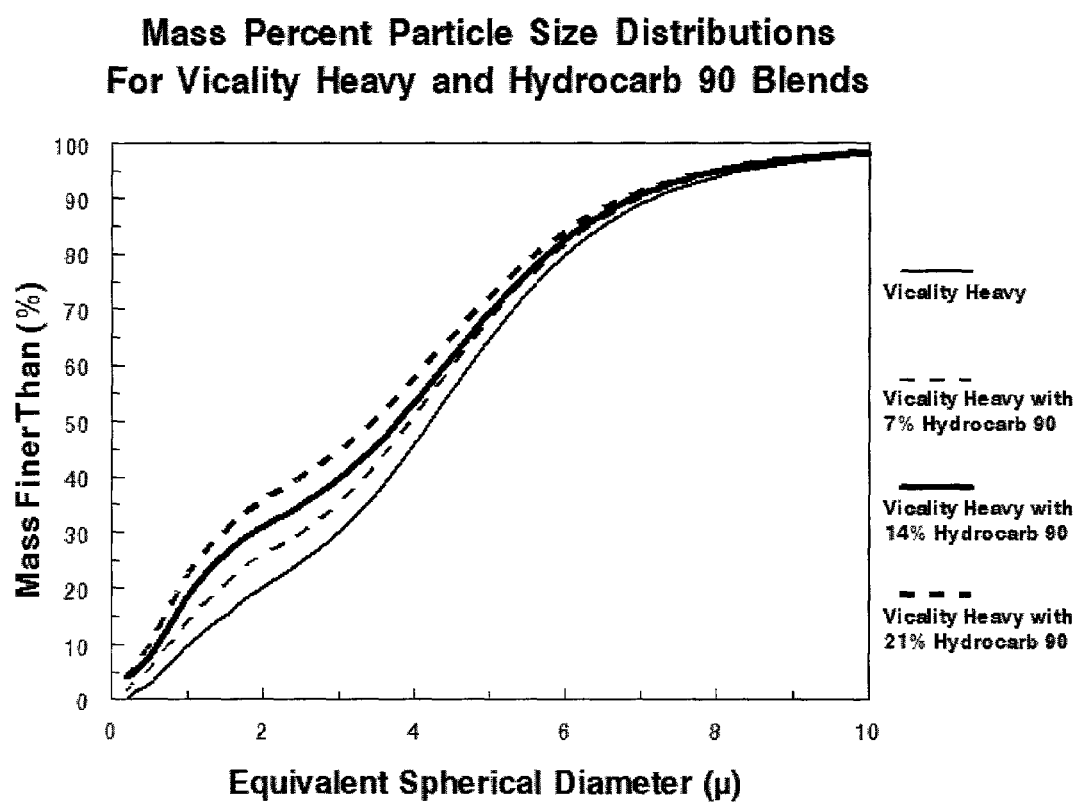
FIG. 9 is a graphical representation of the mass percent particle size distribution of various blends of coarse narrow particle size calcium carbonate pigments with fine calcium carbonate pigments.
Figure 10:
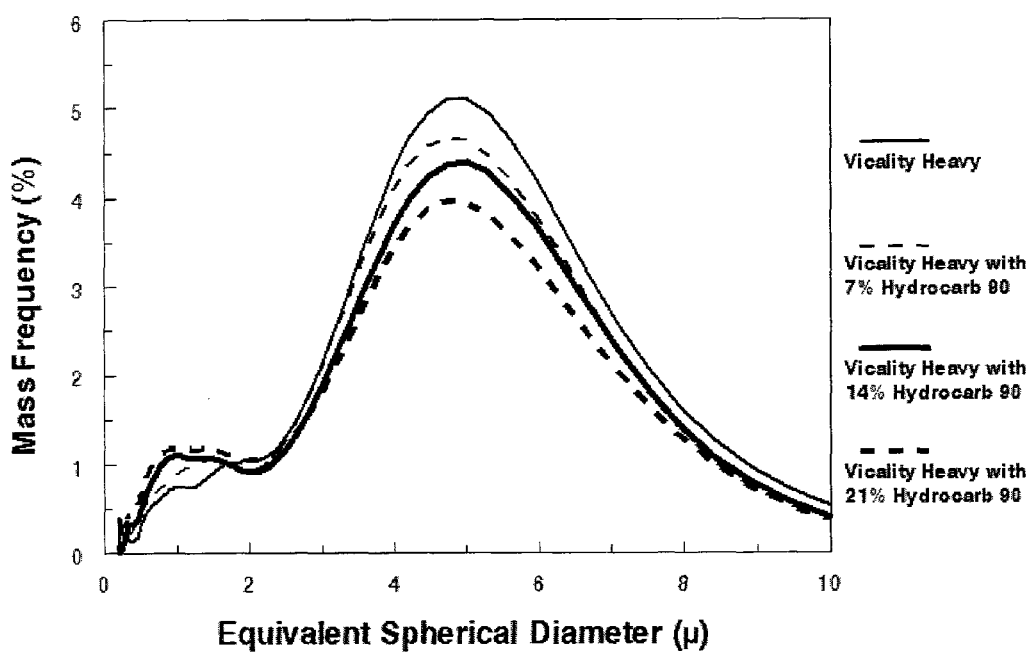
FIG. 10 is a graphical representation of the mass frequency particle size distribution of the pigment blends of FIG. 9.

HYDROCARB® 90 was selected as a fine pigment, and was blended with VICALITY® Heavy to produce blends with 7, 14 and 21 percent by weight HYDROCARB® 90, respectively. Particle size distribution data for blends of VICALITY® Heavy with HYDROCARB® 90 were collected using a SEDIGRAPH® 5120 particle size analyzer. The results are shown in FIGS. 9 and 10.

Additionally, one pigment blend was prepared that included VICALITY® Heavy with 14 percent by weight KAOBRITE™ clay (a commercially available #2 kaolin clay) and another pigment blend was prepared that includes VICALITY® Heavy with 14 percent by weight HYDRAFINE® clay (a #1 kaolin clay commercially available from Kamin, LLC, of Macon, Ga.).

The particle size distribution data of the various pigment blends was collected using a SEDIGRAPH® 5120 particle size analyzer. The results are presented in Table 8, below:

TABLE 8

| | Basecoat Pigment Properties | | | | Coated Board Characteristics | | |
|---|---|---|---|---|---|---|---|
| Basecoat Pigment | Median Particle Size | Percent Less Than 1 Micron | Percent Greater Than 8 Micron | Steepness Index | Basecoat Weight (lb/3000 ft³) | Topcoat Weight (lb/3000 ft³) | Parker Print Smoothness (μ, 10 kg-soft) |
| Hydrocarb 60 | 1.35 | 38.6 | 1.3 | 1.6 | 8.0 | 6.4 | 2.24 |
| Hydrocarb 90 | 0.7 | 68.8 | 0 | 1.4 | 7.5 | 6.3 | 2.34 |
| Albaglos S | 0.87 | 62.3 | 3.6 | 1 | 8.1 | 6.6 | 2.32 |
| Vicality Heavy | 4.32 | 10 | 6.4 | 1 | 7.7 | 5.5 | 1.34 |
| Vicality Heavy with 7% Hydrocarb 90 | 3.96 | 14 | 5.4 | 1.1 | 8.5 | 6.3 | 1.92 |
| Vicality Heavy with 14% Hydrocarb 90 | 3.78 | 18.4 | 5 | 1.2 | 7.7 | 6.1 | 2.09 |
| Vicality Heavy with 21% Hydrocarb 90 | 3.45 | 22.1 | 4.7 | 1.4 | 7.9 | 5.9 | 2.12 |
| Vicality Heavy with 14% Calessence 1500 | 4.58 | 9.2 | 15.6 | 1.1 | 7.2 | 6.2 | 1.47 |
| Vicality Heavy with 25% Calessence 1500 | 5.03 | 7.5 | 24.4 | 1.3 | 8.3 | 6.2 | 1.53 |
| Vicality Heavy with 40% Calessence 1500 | 5.9 | 6.8 | 35.9 | 1.4 | 7.8 | 5.5 | 1.71 |
| Vicality Heavy with 14% Kaobrite | 4.02 | 13.9 | 6 | 1.1 | 8.3 | 6.0 | 2.13 |
| Vicality Heavy with 14% Kaofine 90 | 4.01 | 15.7 | 6.1 | 1.1 | 8.5 | 6.1 | 2.45 |

A solid bleached sulfate (SBS) paperboard was used to make double-coated board samples. The board had an average basis weight of about 125 pounds per 3000 ft² and an average roughness of 7.3 micrometers, as measured by Parker Print Surf (PPS 10S) smoothness.

The pigment blends described above (Table 8) were used to prepare basecoat compositions that were applied to a continuous web of the SBS paperboard using a pilot coater. The basecoat compositions included 100 parts (by weight) pigment/pigment blend and 20 parts by weight binder. Water was used as the carrier component of basecoat compositions to achieve the required solids content for coating. An alkali-swellable thickener was used to adjust the Brookfield 20 rpm viscosity of basecoat compositions to about 2500 cP.

The basecoat compositions were applied at the coat weights presented in Table 8, above. A common top coat was applied to all basecoated structures at the top coat weights presented in Table 8, above. The topcoated structures were gloss calendered, under common conditions, to produce a 75 degree gloss of about 50. Smoothness data are provided in Table 8, above.

Figure 11:
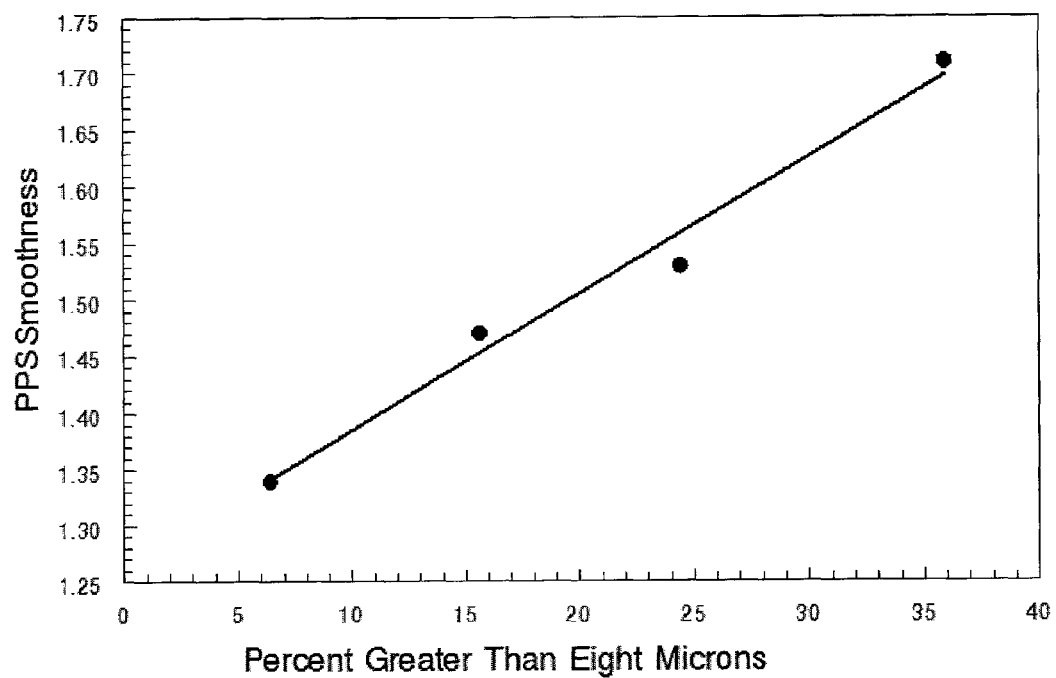
FIG. 11 is a graphical representation of smoothness versus percent of particles greater than 8 micrometers for a blend of coarse narrow particle size calcium carbonate with extra-coarse calcium carbonate.

FIG. 11 shows the effect of increasing coarse particles on calendered smoothness. VICALITY® Heavy has about 6 percent greater than 8 micrometers. The roughness of the outermost coating surface increases substantially linearly as additional coarse particles are added to the pigment blend.

Figure 12:
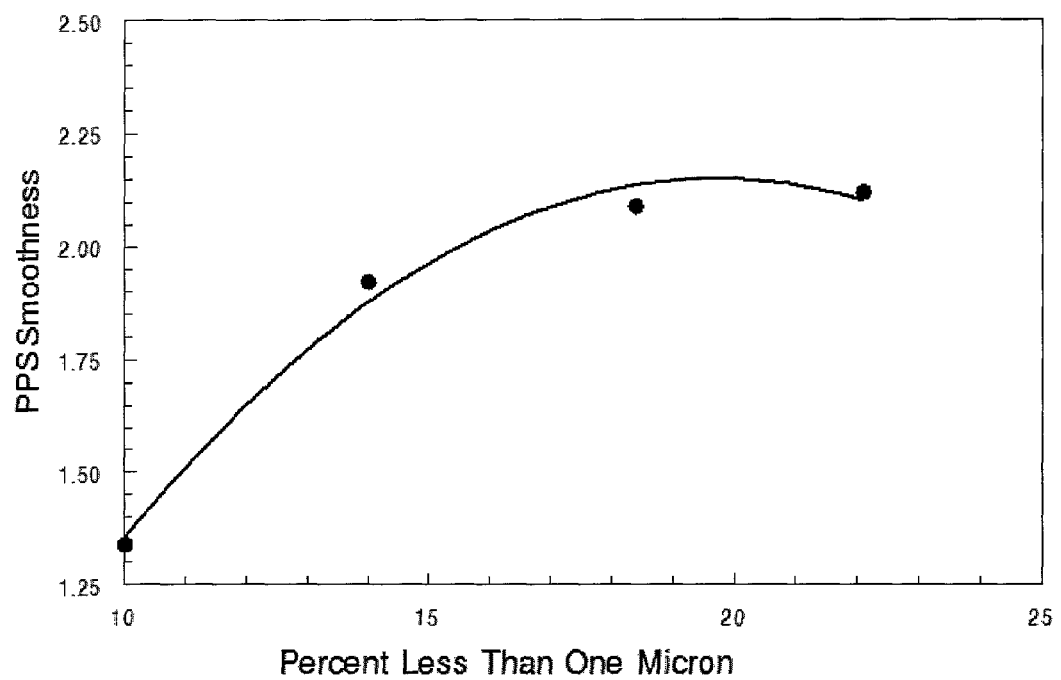
FIG. 12 is a graphical representation of smoothness versus percent of particles less than 1 micrometer for a blend of coarse narrow particle size calcium carbonate with fine ground calcium carbonate.

FIG. 12 shows the effect of increasing the level of fine particles in the basecoat. VICALITY® Heavy has about 10 percent less than 1 micrometer. Increasing the percentage of fine particles significantly increases the roughness. Doubling the percentage to 20 percent negates substantially all of the benefits related to using VICALITY® Heavy.

Figure 13:
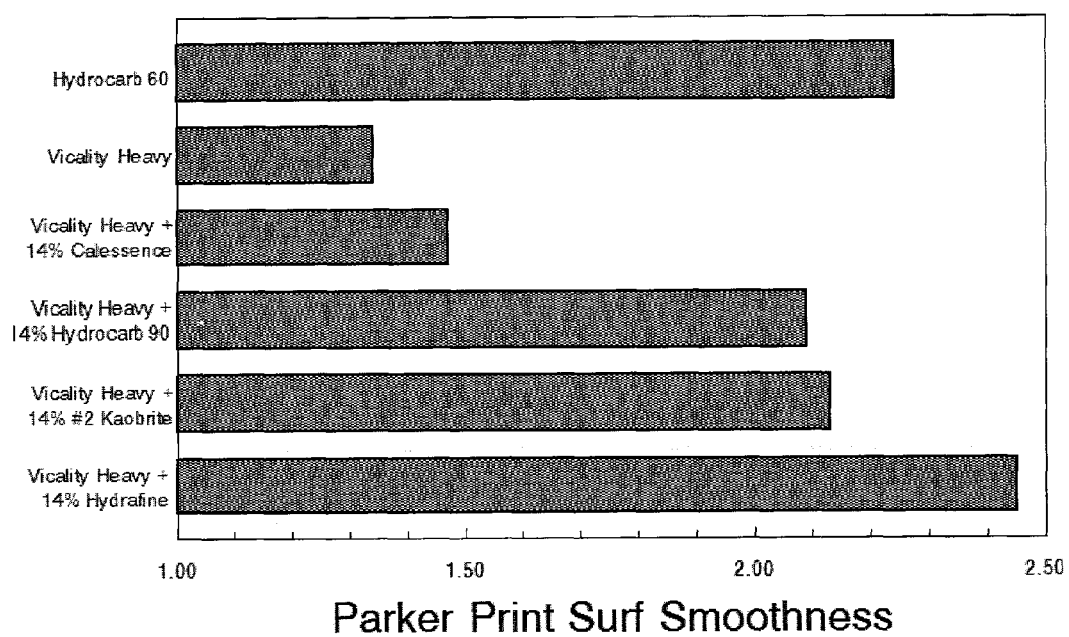
FIG. 13 is a graphical representation of smoothness obtained using various pigment blends.

FIG. 13 contains data for VICALITY® Heavy with 14 parts of CALESSENC® 1500, HYDROCARB® 90, KAO-BRITE™ and HYDRAFINE®. The data show that adding fine clay particles has the same effect as adding fine calcium carbonate particles.

Table 8, above, also contains data for ALBAGLOS® S which was compared to VICALITY® Heavy to demonstrate that a fine narrow particle size calcium carbonate does not give smoothness benefits.

Although various embodiments of the disclosed basecoat composition and associated paperboard structure have been shown and described, modifications may occur to those skilled in the art upon reading the specification. The present patent application includes such modifications and is limited only by the scope of the claims.

What is claimed is:

1. A basecoat composition comprising:
a carrier component; and
a pigment component dispersed in said carrier component, said pigment component comprising all pigments in said basecoat composition,
wherein said pigment component has a median particle size between about 3 and about 8 micrometers, and
wherein at most about 15 percent by weight of said pigment component has a particle size smaller than 1 micrometer, and
wherein at most about 20 percent by weight of said pigment component has a particle size greater than 8 micrometers.

2. The basecoat composition of claim 1 wherein said median particle size is between about 3 and about 7 micrometers.

3. The basecoat composition of claim 1 wherein said median particle size is between about 3 and about 6 micrometers.

4. The basecoat composition of claim 1 wherein said median particle size is between about 4 and about 5 micrometers.

5. The basecoat composition of claim 1 wherein at most about 14 percent by weight of said pigment component has a particle size smaller than 1 micrometer.

6. The basecoat composition of claim 1 wherein at most about 13 percent by weight of said pigment component has a particle size smaller than 1 micrometer.

7. The basecoat composition of claim 1 wherein at most about 12 percent by weight of said pigment component has a particle size smaller than 1 micrometer.

8. The basecoat composition of claim 1 wherein at most about 11 percent by weight of said pigment component has a particle size smaller than 1 micrometer.

9. The basecoat composition of claim 1 wherein at most about 10 percent by weight of said pigment component has a particle size smaller than 1 micrometer.

10. The basecoat composition of claim 1 wherein at most about 15 percent by weight of said pigment component has a particle size greater than 8 micrometers.

11. The basecoat composition of claim 1 wherein at most about 10 percent by weight of said pigment component has a particle size greater than 8 micrometers.

12. The basecoat composition of claim 1 wherein said pigment component has a steepness index of at most about 1.3.

13. The basecoat composition of claim 1 wherein said pigment component has a steepness index of at most about 1.2.

14. The basecoat composition of claim 1 wherein said pigment component has a steepness index of at most about 1.1.

15. The basecoat composition of claim 1 wherein said pigment component has a steepness index of at most about 1.0.

16. The basecoat composition of claim 1 wherein said pigment component comprises calcium carbonate.

17. The basecoat composition of claim 1 wherein said pigment component comprises precipitated calcium carbonate.

18. The basecoat composition of claim 17 wherein said precipitated calcium carbonate comprises at least 50 percent by weight of said pigment component.

19. The basecoat composition of claim 17 wherein said precipitated calcium carbonate comprises at least 70 percent by weight of said pigment component.

20. The basecoat composition of claim 17 wherein said precipitated calcium carbonate comprises at least 80 percent by weight of said pigment component.

21. The basecoat composition of claim 17 wherein said pigment component consists essentially of said precipitated calcium carbonate.

22. The basecoat composition of claim 17 wherein said pigment component further comprises ground calcium carbonate.

23. The basecoat composition of claim 22 wherein said ground calcium carbonate comprises at most 40 percent by weight of said pigment component.

24. The basecoat composition of claim 22 wherein said ground calcium carbonate comprises at most 20 percent by weight of said pigment component.

25. The basecoat composition of claim 17 wherein said pigment component further comprises clay.

26. The basecoat composition of claim 1 wherein said pigment component comprises a blend of pigments.

27. The basecoat composition of claim 1 wherein said pigment component consists essentially of inorganic pigments.

28. The basecoat composition of claim 1 with the proviso that said pigment component is substantially free of platy pigments.

29. The basecoat composition of claim 1 wherein said carrier component comprises at least 30 percent of said basecoat composition.

30. The basecoat composition of claim 1 further comprising a binder in admixture with said carrier component and said pigment component.

31. The basecoat composition of claim 1 further comprising a thickener in admixture with said carrier component and said pigment component.

32. The basecoat composition of claim 1, wherein said pigment component comprises ground calcium carbonate.

\* \* \* \* \*